United States Patent Office 3,443,966
Patented May 13, 1969

3,443,966
PAN AND GRILL FRY SHORTENING
Edward J. Reid, Brea, Calif., assignor to Hunt Foods and Industries, Inc., Fullerton, Calif., a corporation of Delaware
No Drawing. Filed Feb. 23, 1966, Ser. No. 529,271
Int. Cl. A23d 5/02
U.S. Cl. 99—118    10 Claims

ABSTRACT OF THE DISCLOSURE

A pumpable pan and grill fry shortening having, for example, a consistency of unhydrogenated peanut butter at room temperature, is produced by slowly chilling a mixture of hydrogenated soybean oil and coconut oil to obtain an intermediate product having most of its crystals in excess of 200 microns in their largest dimension. This intermediate product is milled to produce a shortening in which most of the crystals are less than 20 microns in their largest dimension. The shortening is stable at relatively high storage temperature. In use it is further characterized by a reduced level of spattering and a reduced amount of sticking when foods are fried.

---

The present invention relates to a pan and grill fry shortening having a pasty consistency over normal ambient room temperatures and more particularly to a suspension of fatty crystals in a liquid triglyceride which suspension is a pumpable fluid over the normal range of room temperatures but not a readily flowable liquid. The oleaginous composition of the composition is further characterized in being a soybean oil and coconut oil blend.

Heretofore, liquid glyceride oils have been converted to pumpable oleaginous suspensions containing a high concentration of normally solid fats. However, in order to obtain a stable suspension it has been necessary to employ rather involved procedures, normally procedures which will assure the predominant formation of the beta crystalline form of the normally solid triglyceride fat. For example, in the procedure disclosed in the Holman et al. U.S. Patent 2,521,219 a normally solid triglyceride fat is first placed in beta crystalline form by rapidly chilling a highly hydrogenated oil on a cool roller and then reducing the cooled product to a flake form. The flaked fat is then placed on a tray to a depth of about 2 inches and held in an oven just below the beta-prime melting point for about 7½ hours. Through this procedure the normally solid fat is substantially converted to the desired beta crystalline form. Thereafter, the solid beta crystalline fat is admixed with a liquid triglyceride. Other rather involved procedures appear in the patent art such as Mitchell, U.S. Patent No. 2,521,242, and Handschumaker et al., U.S. Patent No. 2,999,755 for the production of viscous, stable, fatty compositions.

It is a principal object of the invention to provide a novel blend of triglycerides comprising chiefly soybean oil in a form especially suitable for a pan and grill fry shortening and a process for the production of the shortening.

It is a further object of the invention to provide a pan and grill fry shortening consisting a high proportion of solid fat crystals which shortening is characterized by a stable suspension at higher storage temperatures and by improved properties in use. The product is further characterized in use by a significantly reduced level of spattering and a reduced amount of sticking when foods are fried in a pan or griddle.

It is a still further object of the invention to provide a process for the production of a pumpable oleaginous suspension having approximately the consistency of unhydrogenated peanut butter or a viscous latex paint.

It is a still further object of the invention to provide a simple, straightforward process for the production of a pumpable oleaginous suspension without concern for the crystalline form produced.

It has now been found that a fluid pan and grill fry shortening may be produced from a eutectic blend of hydrogenated soybean oil and coconut oil employing a relatively simple process. The process of the invention for producing a fluid pan and grill fry shortening involves slowly chilling a melt of hydrogenated soybean oil and coconut oil with agitation to a crystallization temperature in the range of 45° F. to 65° F., typically in the range of 53° F. to 57° F. and preferably about 55° F. The chilling is done slowly, typically requiring about 8 to 36 hours to cool from a melt temperature of about 130–140° F. that is not particularly critical to the crystallization temperature. Slow chilling with agitation assures the formation of large size crystals which have been found necessary in the production of the composition of the invention. In order to produce a satisfactory product a predominant portion of the crystals of the cooled fat, prior to a subsequent milling, should be in excess of 200 microns in their largest dimensions. Preferably over 85% of the solid crystals should exceed 200 microns. Proper crystallization of the soybean-coconut oil blend is critical to the manufacture of the fluid pan and grill fry shortening.

The soybean oil employed in the blend is hydrogenated to an iodine value within the critical range of about 70 to 85 and preferably within the more narrow range of 74–77.

Coconut oil forms a eutectic mixture with hydrogenated soybean oil when employed in the composition in an amount within the range of about 10 to 19% by weight of the blend. Preferably, the coconut oil is used in the composition of the invention in an amount within the range of about 14–16% of the oil blend. It has been observed that the incorporation of less and larger quantities of the coconut oil in the composition results in the formation of a thick, very viscous material as the melt of the blend is cooled during processing below its cloud point. The incorporation of the coconut oil in the fatty composition within the foregoing ranges gives a product of the desired consistency which is fluid but not a readily pourable liquid at room temperatures and which is a material which may be pumped. The use of smaller quantities of the coconut oil results in a stiff and hard product and the incorporation of too much coconut oil gives a too readily purable liquid.

After the milling step to be described the pan and grill fry shortening of the invention will have a consistency approximating that of unhydrogenated peanut butter or a viscous latex paint. It will be substantially more viscous than the liquid shortenings presently on the market. The increased-viscosity product of the invention has been found to have distinctly superior high temperature stability.

Following chilling of the blend to produce the relatively large size crystals, the composition is pumped to a mill and there subjected to a milling to produce the end product which is characterized by having a predominant portion of its crystals with a micron size of less than 20 microns in their largest dimension. Desirably over 85% of the crystals are less than 20 microns in their largest dimension. Typically, at least 75% of the crystals following milling have a maximum dimension of less than 15 microns. Herein, the term "crystals" is employed to cover both single crystals and crystal agglomerates.

The milling is preferably accomplished in a colloid-type mill whose setting is not in excess of 0.020 inch. It has been observed when a colloid mill is provided with larger settings that there is little or substantially no appreciable change in the size of the crystals of the liquid passing therethrough. However, when the mill setting is reduced to about 0.020 inch the coarse crystals are almost all completely broken up and a smooth, thick consistency product is obtained. Gap settings in the range of about 0.010–0.020 inch are preferred. The mill setting and throughput rate should be correlated to obtain exit temperatures of the composition stream passing therethrough which will not result in melting or any significant melting of the product. Desirably the exiting product stream has a temperature within the range of 70 to 85° F. It has been found that milling with a piston-type homogenizer does not appreciably change the crystal size.

Typically the product of the invention has a viscosity within the range of 75,000 to over 100,000 centipoises at 75° F. measured with a Brookfield viscosimeter (Ser. No. RVT–RL–110, using a number 3 disc). It has been observed that increasing the speed of the disc increases the viscosity of the pan and grill fry shortening which is in contradistinction to liquid shortenings wherein there is a decrease in viscosity. For example, at a speed of 0.5 r.p.m. a typical pan and grill fry shortening of the invention will show a viscosity of 98,000 centipoises, which will increase to over 100,000 at speeds in the range of 1.0–10.0 r.p.m. On the other hand a typical liquid shortening, selected as one of the more viscous of those commercially available, showed a viscosity of 10,000 centipoises at 0.5 r.p.m., which decreased to 6000, 3400, 2100 and 1300 at respective speeds of 1.0, 2.5, 5.0 and 10.0 r.p.m.

Typically the pan and grill fry shortening of the invention will have a package penetration at 60° F. of 80 plus or minus 10. The package penetration test is a conventional one and employs a cone-shaped shaft which is permitted to fall into the product. The depth of penetration is a measure of product's consistency; the lower the value, the harder the product. Liquid shortenings do not have a package penetration and a plastic type shortening characteristically has a package penetration at 60° F. of 50 plus or minus 10.

In a preferred formulation of the pan and grill fry shortening a small amount of lecithin, usually in the range of about 0.1 to 0.5% the weight of the composition, is employed. Small amounts of artificial coloring and/or flavoring may also be added. Likewise a small amount of butter fat, usually less than 1%, can be employed. Lecithin will minimize sticking of the product to a utensil in which the shortening is being used. The coconut oil of the product also imparts the desirable characteristic of reducing the level of spattering when a food containing moisture is pan fried using the hot shortening.

It is to be understood that the following examples are merely illustrative of the process and product of the invention and that the invention is not limited thereto but rather is defined by the appended claims.

EXAMPLE I

A mixture of 85% 78 I.V. soybean oil, 13.42% coconut oil, 0.80% butter fat, 0.25% lecithin, 0.50% artificial color and 0.03% artificial flavor was formed at a temperature of 140° F. The heated mixture was cooled to 55° F. with agitation, the cooling being effected in equipment having a gate paddle impeller rotated at 24 r.p.m. The cooled material was held at 55° F. for one hour with agitation. The resulting liquid-crystal mixture at 55° F. was pumped to a Charlotte mill to reduce the size of the crystals. The clearance between the mill's rotor and stator was 0.010 inch.

EXAMPLE II

A melt containing by weight 85% soybean oil (76 I.V.), 14.7% coconut oil, 0.25% lecithin, 0.005% artificial color and 0.45% artificial flavor was slowly cooled to 55° F. under mechanical agitation. The mixture was then pumped to a colloid mill with a mill setting of 0.015 inch. The temperature of the product from the mill was 81.5° F. The composition at 73° F. was not pourable or fluid but was pumpable or flowable with mechanical force.

I claim:
1. A process for producing a fluid pan and grill fry shortening comprising:
   slowly chilling a melt of hydrogenated soybean oil and coconut oil with agitation to a temperature within the range of about 45 to 65° F. to obtain an intermediate product characterized by having at least about 85% of its crystals in excess of 200 microns in their largest dimension, said soybean oil having an iodine value in the range of about 70 to 85 and the coconut oil being present in the oil mixture in an amount within the range of 10 to 19% by weight; and
   passing the intermediate crystallized product to a colloidal mill and there milling the product to obtain a pan and grill fry product having at least about 85% of its crystals less than 20 microns in their largest dimension and further characterized in having a consistency approximating that of unhydrogenated peanut butter at ambient room temperature.

2. A process in accordance with claim 1 wherein the melt is cooled to a temperature in the range of 53° to 57° F.

3. A process in accordance with claim 1 wherein the colloid mill has a mill setting of less than 0.020 inch.

4. A process in accordance with claim 1 wherein the coconut oil is present in the oil mixture in an amount within the range of 14 to 16% by weight.

5. A process in accordance with claim 1 wherein the pan and grill fry shortening product has a viscosity within the range of 75,000 to more than 100,000 centipoises.

6. A process in accordance with claim 1 wherein the soybean oil has an iodine value of 74–77.

7. A process in accordance with claim 1 wherein the time of chilling from the temperature of the melt to the crystallization temperature is within the range of 8 to 36 hours.

8. A process in accordance with claim 1 wherein the melt is cooled to a crystallization temperature of about 55° F.

9. A process in accordance with claim 1 wherein at least 75% of the crystals of the pan and grill fry shortening product are less than 15 microns in their largest dimension.

10. A process in accordance with claim 1 wherein the colloid mill has a mill setting in the range of about 0.010–0.020 inch.

References Cited

UNITED STATES PATENTS 2,859,119    11/1958    Cochran et al. _____ 99—118

MAURICE W. GREENSTEIN, *Primary Examiner.*